US008521855B2

(12) United States Patent
Lim et al.

(10) Patent No.: US 8,521,855 B2
(45) Date of Patent: Aug. 27, 2013

(54) CENTRALIZED SERVER-DIRECTED POWER MANAGEMENT IN A DISTRIBUTED COMPUTING SYSTEM

(75) Inventors: Jin Keat Lim, Penang (MY); Chin Guan Tan, Penang (MY); Cheah Luan Ho, Penang (MY); Choon Lay Ong, Penang (MY)

(73) Assignee: Intel Corporation, Santa Clara, CA (US)

( * ) Notice: Subject to any disclaimer, the term of this patent is extended or adjusted under 35 U.S.C. 154(b) by 1226 days.

(21) Appl. No.: 11/237,289

(22) Filed: Sep. 27, 2005

(65) Prior Publication Data

US 2007/0073709 A1 Mar. 29, 2007

(51) Int. Cl.
*G06F 15/173* (2006.01)

(52) U.S. Cl.
USPC ........... 709/223; 713/300; 709/224; 709/226; 711/106

(58) Field of Classification Search
USPC .......................................... 709/223, 224, 226
See application file for complete search history.

(56) References Cited

U.S. PATENT DOCUMENTS

| 5,465,392 | A | * | 11/1995 | Baptist et al. | 370/310 |
|---|---|---|---|---|---|
| 6,115,823 | A | * | 9/2000 | Velasco et al. | 713/322 |
| 6,330,639 | B1 | * | 12/2001 | Fanning et al. | 711/106 |
| 6,584,571 | B1 | * | 6/2003 | Fung | 713/310 |
| 6,614,277 | B1 | * | 9/2003 | Martini | 327/227 |
| 2003/0188208 | A1 | * | 10/2003 | Fung | 713/320 |
| 2004/0003300 | A1 | * | 1/2004 | Malueg et al. | 713/300 |
| 2005/0136914 | A1 | * | 6/2005 | van Kampen et al. | 455/426.2 |
| 2005/0177755 | A1 | * | 8/2005 | Fung | 713/300 |
| 2005/0289371 | A1 | * | 12/2005 | Makiyama et al. | 713/300 |

* cited by examiner

*Primary Examiner* — Jude Jean Gilles
*Assistant Examiner* — Jaren M Means
(74) *Attorney, Agent, or Firm* — Blakely, Sokoloff, Taylor & Zafman LLP

(57) ABSTRACT

In one embodiment, a method includes periodically collecting device operation data from a plurality of client devices of a distributed computing system, and making power management decisions for the distributed computing system based on the collected data.

18 Claims, 7 Drawing Sheets

CENTRALIZED SERVER-DIRECTED POWER MANAGEMENT IN A DISTRIBUTED COMPUTING SYSTEM

FIELD

Embodiments of the invention relate generally to distributed computing systems, and more specifically to centralized server-directed power management in a distributed computing system.

BACKGROUND

In today's computer industry, the Advanced Configuration and Power Interface (ACPI) specification was developed to establish industry common interfaces enabling robust operating system (OS)-directed motherboard device configuration and power management of devices and entire systems. ACPI is the key element in OS-directed configuration and power management (OSPM). The OSPM concepts serve well in personal computer power management in which power management decisions are made by the OS of a personal computer. In a distributed computing system including multiple computers, the OS of an individual computer cannot effectively make power management decisions because the OS is only capable of gathering power management information within this individual computer. As a result, in a distributed computing system, all client machines are typically fully powered on and stay in working state, regardless of whether there are any jobs running on the individual client machines.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DESCRIPTION OF EMBODIMENTS

Figure 1:
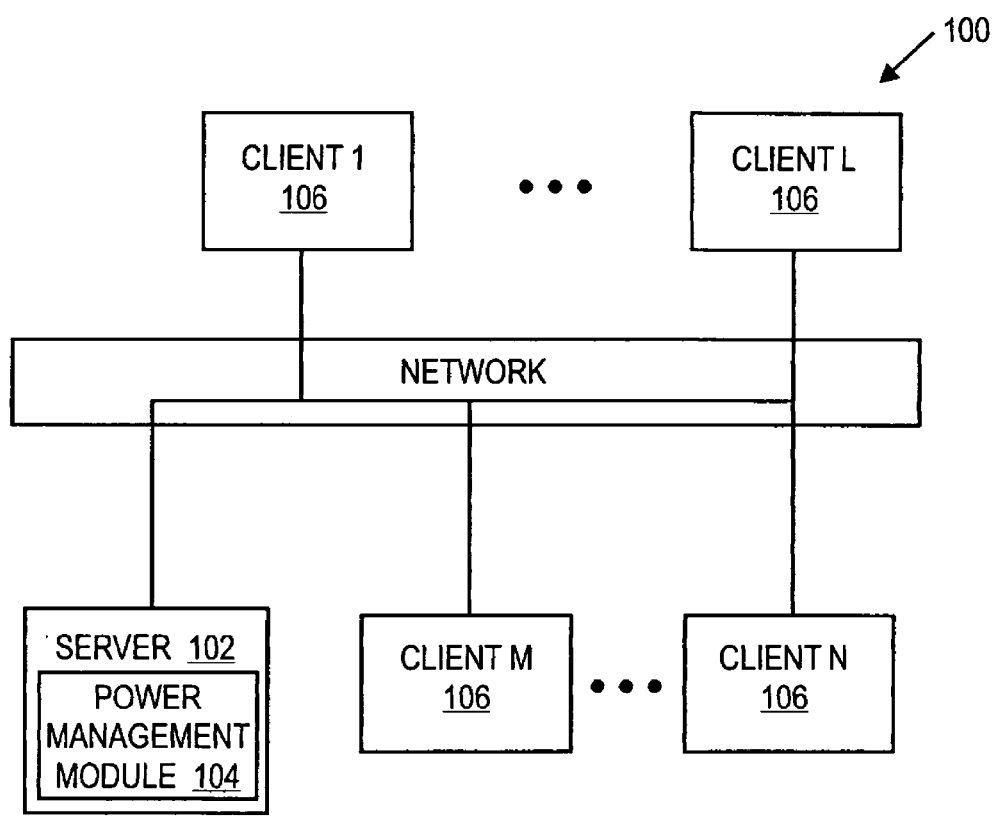
FIG. 1 illustrates a block diagram of one embodiment of a distributed computing system.

A method and apparatus for power management in a distributed computing system is described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe protection of privacy of networked devices containing management subsystems in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, processes of the present invention might be performed by specific hardware components that contain hardwired logic for performing the processes, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet.

FIG. 1 illustrates a block diagram of one embodiment of a distributed computing system 100. The system 100 includes client devices (a pool of clients) 106 coupled with a server (e.g., a pool master) 102 via a network (e.g., a public network such as the Internet or a private network such as a local area network (LAN)). The server 102 controls the flow of jobs in the system 100. In one embodiment, the server 102 maintains a number of job queues and matches jobs that are waiting in the queues with currently idle clients 106. In one embodiment, the server 102 runs on a designated machine. Alternatively, the machine on which the server 102 runs also serves as a client and accepts jobs.

In one embodiment, the server 102 includes a power management module 104. The power management module 104 periodically collects data pertaining to the operation of the clients 106. This data may include, for example, information on utilization of client resources (e.g., CPU utilization, memory utilization, etc.) and/or the state of each client 106 (e.g., active or asleep). Based on the collected data, the module 104 makes power management decisions for the system 100 and delegates jobs submitted by users to clients 106 depending on the current state and resource utilization of the clients 106. In one embodiment, the module 104 operates using thresholds associated with the overall resource utilization within the system 100. These thresholds may include, for example, a wakeup region threshold and a sleep region threshold. The sleep region threshold may control transitioning of currently active clients into the sleep mode. The wakeup region threshold may control invocation of currently suspended clients. In one embodiment, active clients are suspended to a sleep state with network connectivity remaining active. The suspended clients may then be invoked using a remote wakeup protocol.

Figure 2:
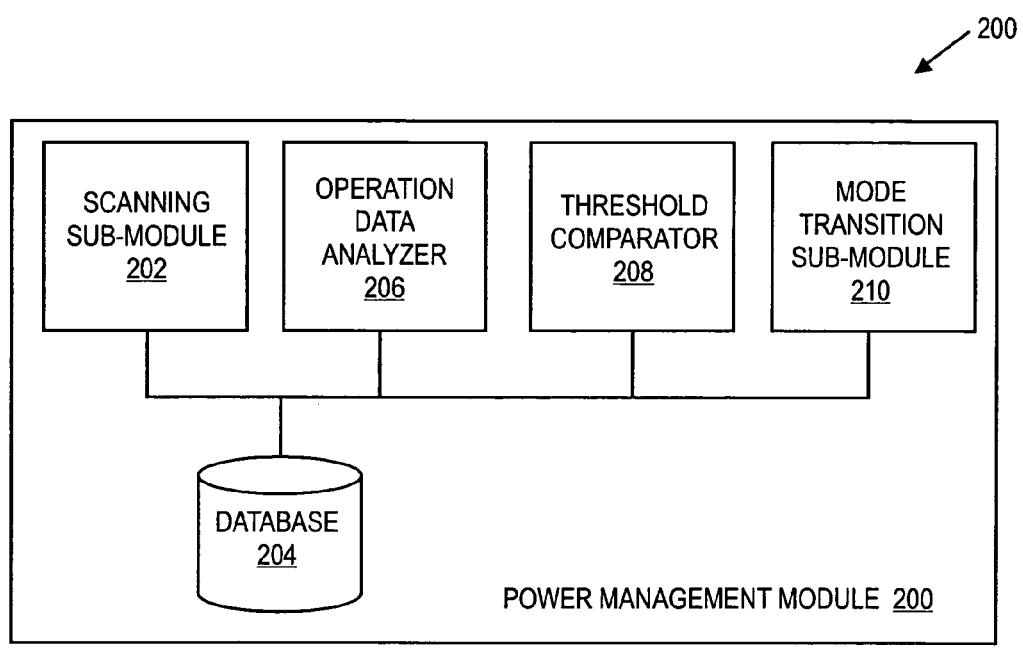
FIG. 2 illustrates a block diagram of one embodiment of a power management module.

FIG. 2 is a block diagram of one embodiment of a power management module 104. The power management module 200 includes a scanning sub-module 202, a database 204, an operation data analyzer 206, a threshold comparator 208, and a mode transition sub-module 210.

The scanning sub-module 202 is responsible for collecting data pertaining to the operation of clients 106 and storing the collected data in the database 204. In one embodiment, the scanning sub-module 202 collects data at predefined time intervals by sending requests to the clients 106. The time intervals may be specified by a user or defined programmatically. The client operation data may include information on utilization of client hardware (e.g., CPU utilization, memory utilization, etc.). In one embodiment, the scanning sub-module 202 sends requests for client operation data to each client. Alternatively, the scanning sub-module 202 first accesses the database 204 to identify currently active clients and then sends the requests for client operation data only to the currently active clients.

The operation data analyzer 206 is responsible for analyzing the collected data and calculating a current operation characteristic of the distributed computing system 100 based on the collected data. The current operation characteristic of the system may be, for example, an average CPU utilization parameter, an average memory utilization parameter, etc. In one embodiment, the operation data analyzer 206 generates a graph illustrating changes in the system operation characteristic over time.

The threshold comparator 208 is responsible for comparing the current system operation characteristic with predefined thresholds to determine whether the overall client state needs to be changed. In one embodiment, if the system operation characteristic reaches a wakeup region threshold, then the number of currently active clients is insufficient to run the pending jobs. If the system operation characteristic reaches a sleep region threshold, then a smaller number of clients is needed to run currently pending jobs.

The mode transition sub-module 210 is responsible for determining the number of clients that should be transitioned into a different mode and initiating the appropriate transitions. In one embodiment, the mode transition sub-module initiates a transition by sending a mode transition signal (e.g., wakeup or sleep signal) to corresponding clients. In one embodiment, the mode transition sub-module 210 determines the number of clients to undergo the transition based on the rate at which the system operation characteristic is changing. In one embodiment, the rate is calculated by determining a difference between the current system operation characteristic and a previous system operation characteristic and dividing this difference by the time interval between the two characteristics.

Figure 3:
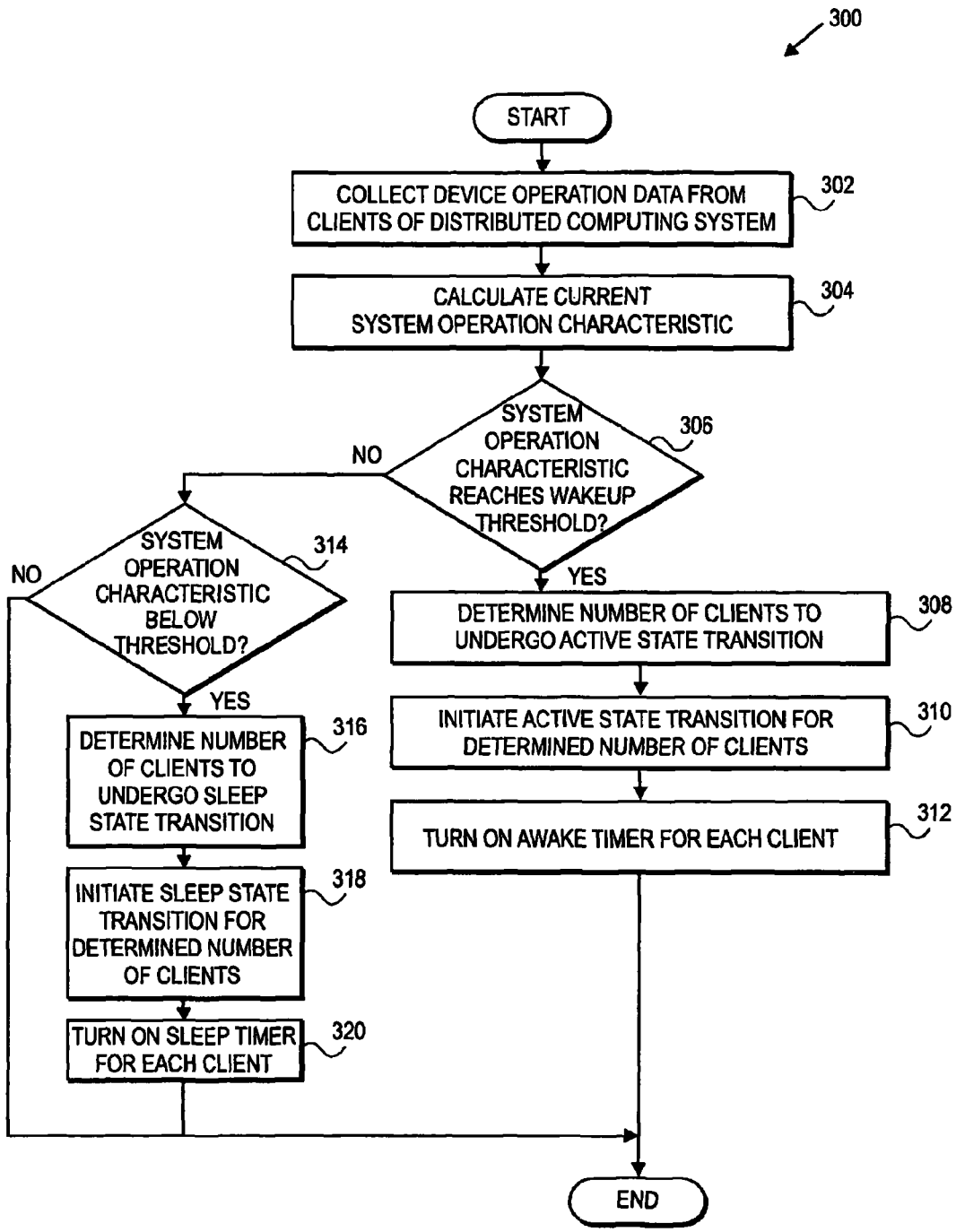
FIG. 3 is a flow diagram of one embodiment of a process for power management in a distributed computing system.

FIG. 3 is a flow diagram of one embodiment of a process 300 for power management in a distributed computing system. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 300 is performed by a power management module 104 of FIG. 1.

Referring to FIG. 3, process 300 begins with processing logic collecting device operation data from clients of a distributed computing system (processing block 302). As discussed above, the device operation data may specify resource utilization parameter(s) (e.g., a CPU utilization parameter, a memory utilization parameter, etc.) and/or state information of a relevant client. In one embodiment, the device operation data is collected at predefined time intervals that may be specified by a user or defined programmatically. In this embodiment, process 300 is performed periodically, at the predefined time intervals.

At processing block 304, processing logic calculates a current system operation characteristic. The current system operation characteristic is impacted by job consumption and new job insertion into the job queues. The current system operation characteristic may be an average CPU utilization of the clients, an average memory utilization of the clients or any other characteristic indicating the current usage of client resources within the system.

At processing block 306, processing logic determines whether the current system operation characteristic reaches a wakeup region threshold. If so, processing logic determines the number of clients that should be transitioned into the active mode (processing block 308). In one embodiment, processing logic determines the number of clients to undergo the transition by first calculating the rate at which the system operation characteristic is increasing and then identifying the number of clients corresponding to the calculated rate. The correspondence between rate ranges and client numbers may be specified by the user or defined programmatically.

Next, processing logic initiates the active mode transition for the determined number of suspended clients (processing block 310) and turns on the awake timer for each of these clients (processing block 312). In one embodiment, processing logic initiates the active mode transition by sending a wakeup signal to each of these clients using a remote wakeup protocol. In one embodiment, processing logic determines which suspended clients should be transitioned into the active mode based on the duration of their sleep timers (e.g., clients that remained in the sleep mode the longest are invoked first). In one embodiment, once a client is transitioned into the active mode, it should remain active for a minimum "stay-awake" time. In one embodiment, processing logic calculates the minimum stay-awake time for the client as an average job processing time of this client (e.g., an average of 3 most time-consuming jobs out of 10 recently processed jobs). Alternatively, the minimum stay-awake time may be a predefined time interval specified by a user or defined programmatically.

If the determination made at processing block 306 is negative, processing logic further determines whether the current system operation characteristic is below the sleep threshold (processing block 314). If not, process 300 ends. If so, processing logic determines the number of clients that should be transitioned into the sleep mode (processing block 316). In one embodiment, processing logic determines the number of clients to undergo the transition by first calculating the rate at which the system operation characteristic is decreasing and then identifying the number of clients corresponding to the calculated rate. The correspondence between rate ranges and client numbers may be specified by the user or defined programmatically.

Next, processing logic initiates the sleep mode transition for the determined number of clients (processing block 318) and turns on the sleep timer for each of these clients (processing block 320). In one embodiment, processing logic initiates the sleep mode transition by sending a sleep signal to each of these clients. In one embodiment, processing logic determines which clients should be transitioned into the sleep mode based on the duration of their awake timers (e.g., idle clients that remained in the active mode the longest are transitioned into the sleep mode first).

Figure 4:
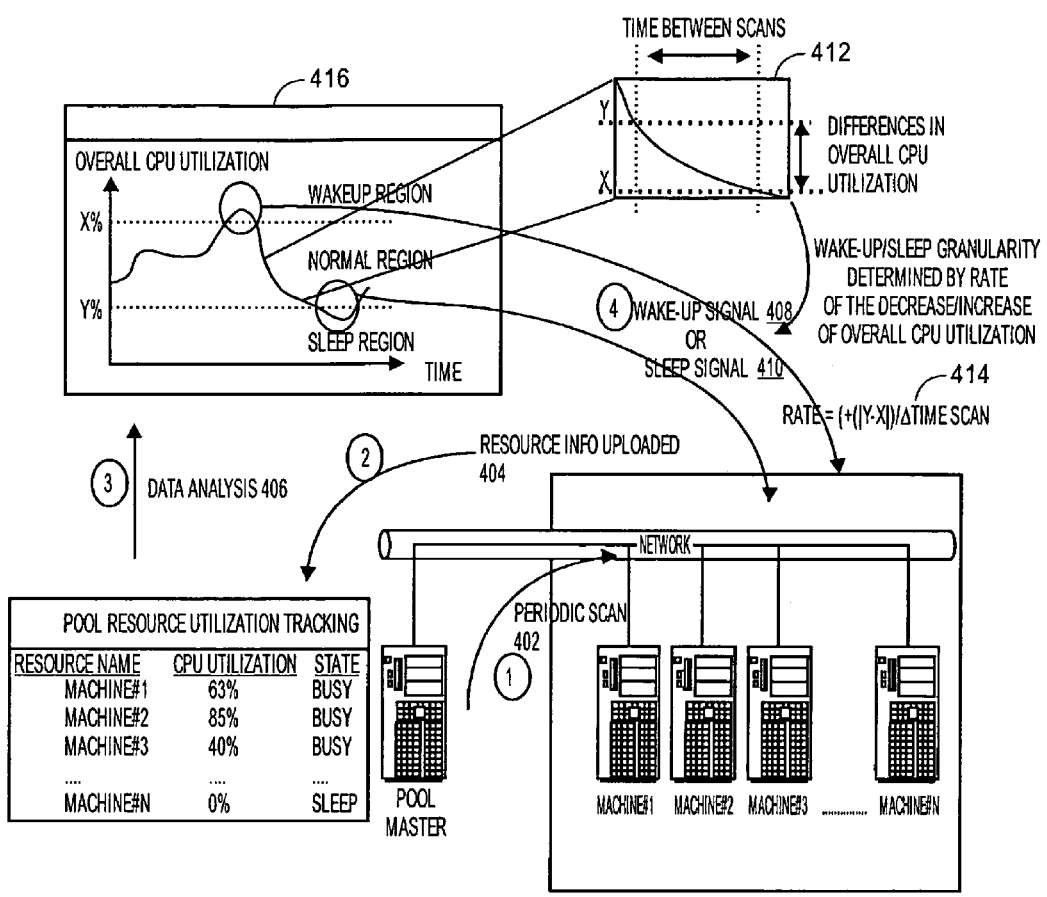
FIG. 4 illustrates stages of one embodiment of a power management process.

FIG. 4 illustrates stages of one embodiment of a power management process. Stage 1 is a periodic scan 402 by a pool master on the overall state of machines in the pool. Periodic scan 402 is performed at predefined time intervals to collect information on the machines' CPU utilization and state.

At stage 2, the pool master uploads the collected information into a database, as illustrated by numeral 404.

At stage 3, the pool master performs data analysis 406 of pool resource utilization. In particular, the pool master calculates an overall CPU utilization parameter as an average CPU utilization for the pool, generates a graph 416 illustrating changes in the overall CPU utilization, and evaluates the overall CPU utilization against the thresholds (the wakeup region threshold and the sleep region threshold).

At stage 4, the pool master performs mode transitioning. In particular, when the wakeup region threshold is reached, with the overall CPU utilization approaching X %, the suspended clients are gradually switched to the active mode by sending a wakeup signal 408 to each of these clients and turning on the awake timer for each of these clients. The number of clients gradually undergoing the state transition is determined based on the rate at which the overall CPU utilization is increasing, to accommodate the growth of jobs submitted by the user. As illustrated by a graph extract 412 and expression 414, the number of clients undergoing the state transition is determined by calculating the difference between the overall CPU utilization associated with the current scan X and the overall CPU utilization associated with a prior scan Y, and dividing this difference by a time interval between the two scans.

When the sleep region threshold is reached, with the overall CPU utilization approaching Y %, idle clients with the longest expired awake timers are gradually transitioned into the sleep mode by sending a sleep signal 410 to each of these clients and turning on the sleep timer for each of these clients. The number of clients gradually undergoing the state transition is determined based on the rate at which the overall CPU utilization is decreasing. During the mode transition period, periodic checks of the overall client CPU utilization may trigger a stop point to the continuous sleep mode transition of the subsequent clients if the overall CPU utilization rises up to the normal region. The duration of the elapsed sleep timer for each client will consequently determine the sequence of clients undergoing the next active mode gradual transition.

Figure 5:
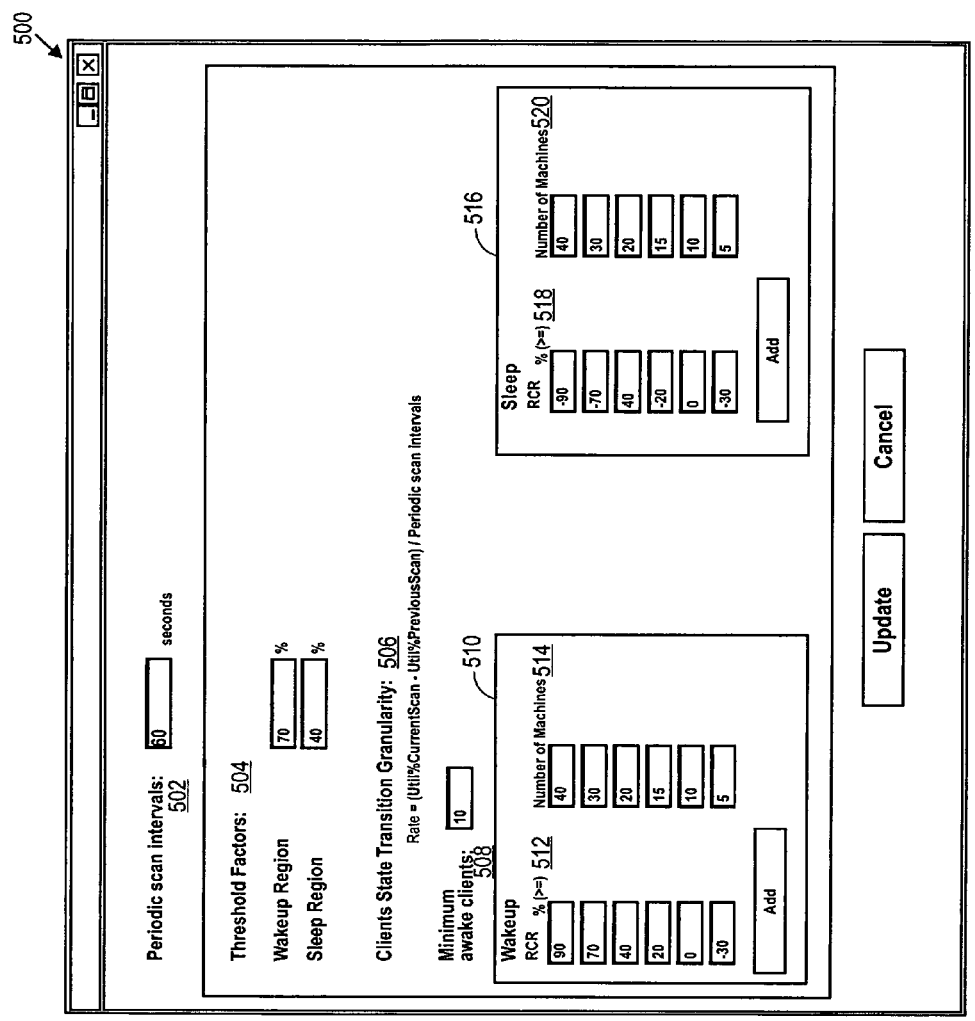
FIG. 5 illustrates an exemplary power management user interface.

FIG. 5 illustrates an exemplary power management user interface (UI) 500. The UI 500 facilitates user input of periodic scan intervals 502 and thresholds 504 (a wakeup region threshold and a sleep region threshold). In addition, the UI 500 displays an expression 506 for calculating the rate of the increase/decrease of the overall CPU utilization, and allows the user to specify clients' state transition granularity for different ranges of the relative change in the rate (RCR). One embodiment of RCR calculation will be discussed in greater detail below in conjunction with FIG. 6.

As shown in FIG. 5, for a wakeup mode transition 510, the user can specify the minimum number 508 of clients to undergo the wakeup mode transition and provide the number of machines 514 to be invoked for different RCR ranges 512. For a sleep transition 516, the user is allowed to provide the number of machines 520 to be suspended for different RCR ranges 518.

Figure 6:
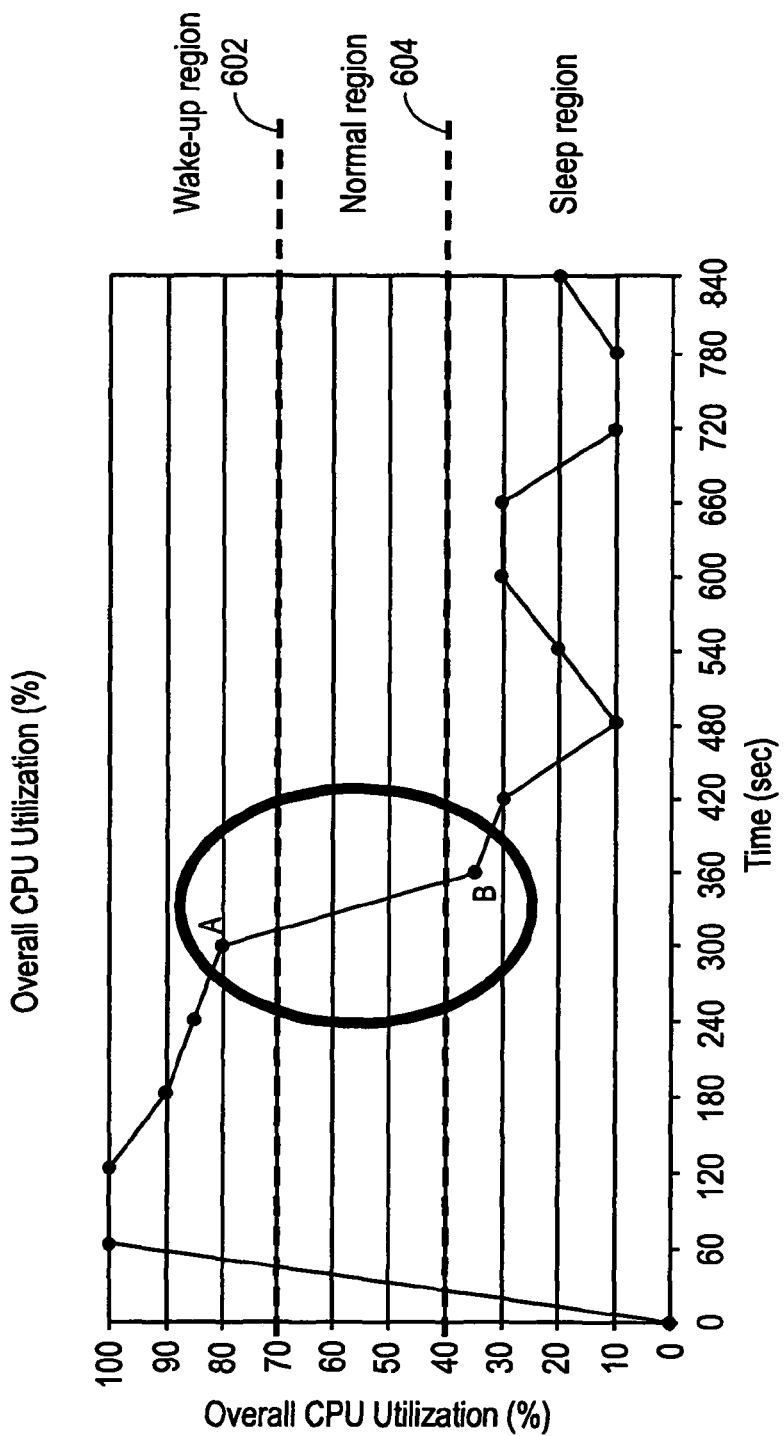
FIG. 6 illustrates an exemplary CPU utilization graph.

FIG. 6 illustrates an exemplary CPU utilization graph corresponding to periodic scan intervals of 60 seconds. Points in the graph are compared with the wakeup region threshold 602 and the sleep region threshold 604. For a point in a sleep region, RCR may be calculated as follows:

$$RCR=(Rate/RateMax)*100,$$

wherein RateMax is the largest possible value for the rate of CPU utilization changes, which is computed by diving the difference between the largest and smallest possible CPU utilization by the scan interval. For example, for the graph shown in FIG. 5, the largest possible value for the rate is (100−0)/60=+1.6667. The rate at which the overall CPU utilization is changing is determined by first computing the difference between the overall CPU utilization associated with the current scan and the overall CPU utilization associated with a prior scan, and then dividing this difference by the time interval between the two scans. For example, for point B, Rate=(35%−45%)/60 seconds=−0.75.

For a point in a wakeup region, RCR may be calculated as follows:

$$RCR=(Rate/RateMin)*100,$$

wherein RateMin is the smallest possible value for the rate of CPU utilization changes, which is computed as the difference between the smallest and largest possible CPU utilization divided by the scan interval. For example, for the graph shown in FIG. 5, the smallest possible value for the rate is (0−100)/60=−1.6667.

Figure 7:
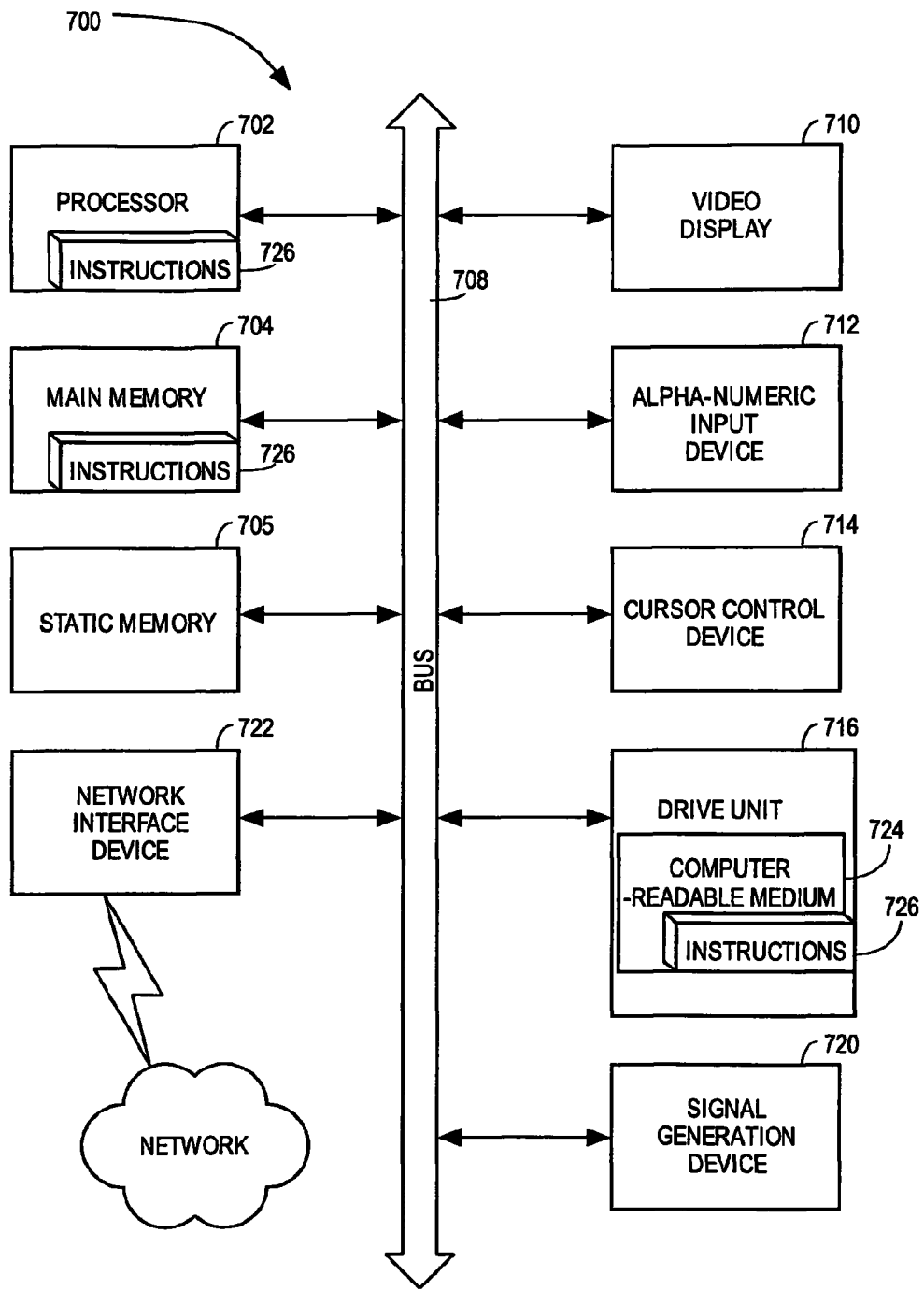
FIG. 7 is a block diagram of one embodiment of a computer system.

FIG. 7 shows a diagrammatic representation of machine in the exemplary form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 702 (e.g., a central processing unit (CPU), a graphics processing unit (GPU) or both), a main memory 704 (e.g., read only memory (ROM), flash memory, dynamic random access memory (DRAM) such as synchronous DRAM (SDRAM) or Rambus DRAM (RDRAM), etc.) and a static memory 706 (e.g., flash memory, static random access memory (SRAM), etc.), which communicate with each other via a bus 708.

The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 720 (e.g., a speaker) and a network interface device 722.

The disk drive unit 716 includes a machine-readable medium 724 on which is stored one or more sets of instructions (e.g., software 726) embodying any one or more of the methodologies or functions described herein. The software 726 may also reside, completely or at least partially, within the main memory 704 and/or within the processor 702 during execution thereof by the computer system 700, the main memory 704 and the processor 702 also constituting machine-readable media.

The software 726 may further be transmitted or received over a network 728 via the network interface device 722.

While the machine-readable medium 724 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and apparatus for power management in a distributed computing system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
  receiving, by a server machine at predefined time intervals, client utilization data, the client utilization data including client processing unit utilization or client memory utilization data for each of a plurality of active client machines coupled to the server over a network;
  determining, by the server machine, an overall utilization parameter for the plurality of active client machines based upon the received client utilization data at a time interval;
  determining, by the server machine, a rate at which the overall utilization parameter is changing in response to the overall utilization parameter being above or below a threshold;
  determining, by the server machine, how many client machines to transition between an active mode and a sleep mode based upon the rate and in response to the overall utilization parameter being above or below the threshold; and
  sending a transition signal from the server machine to the determined number of client machines to transition between an active mode and a sleep mode,
    wherein, when the overall utilization parameter is above the threshold, the transition signal is a wakeup transition signal and the determined number of client machines is a number of suspended client machines to transition to the active mode based upon the rate at which the overall utilization parameter is increasing, and
    wherein, when the overall utilization parameter is below the threshold, the transition signal is a sleep transition signal and the determined number of client machines is a number of the active client machines to transition to the sleep mode based upon the rate at which the overall utilization parameter is decreasing.

2. The method of claim 1, wherein the wakeup transition signal is sent to suspended client machines that have been in the sleep mode longer than other suspended client machines coupled to the server over the network.

3. The method of claim 2, wherein a suspended client machine that receives the wakeup transition signal will remain in the active mode for at least a predetermined period of time after transitioning from the sleep mode to the active mode.

4. The method of claim 1, wherein the sleep transition signal is sent to active client machines that have been in the active mode longer than other active client machines in the plurality of active client machines coupled to the server over a network.

5. The method of claim 4, wherein a suspended client machine that receives sleep transition signal will remain in the sleep mode for at least a predetermined period of time after transitioning from the active mode to the sleep mode.

6. The method of claim 1, wherein the rate at which the overall utilization parameter is increasing is determined when the overall utilization parameter is above a first threshold, the rate at which the overall utilization parameter is decreasing is determined when the overall utilization parameter is below a second threshold, and the first threshold is greater than the second threshold.

7. A non-transitory machine readable storage medium storing instructions that, when executed by a processing device, causes the processing device to perform a method comprising:
  receiving, at predefined time intervals, client utilization data, the client utilization data including client processing unit utilization or client memory utilization data for each of a plurality of active client machines coupled to the server over a network;
  determining an overall utilization parameter for the plurality of active client machines based upon the received client utilization data at a time interval;

determining a rate at which the overall utilization parameter is changing in response to the overall utilization parameter being above or below a threshold;

determining how many client machines to transition between an active mode and a sleep mode based upon the rate and in response to the overall utilization parameter being above or below the threshold; and sending a transition signal to the determined number of client machines to transition between an active mode and a sleep mode, wherein, when the overall utilization parameter is above the threshold, the transition signal is a wakeup transition signal and the determined number of client machines is a number of suspended client machines to transition to the active mode based upon the rate at which the overall utilization parameter is increasing, and wherein, when the overall utilization parameter is below the threshold, the transition signal is a sleep transition signal and the determined number of client machines is a number of the active client machines to transition to the sleep mode based upon the rate at which the overall utilization parameter is decreasing.

8. The machine readable storage medium of claim 7, wherein the wakeup transition signal is sent to suspended client machines that have been in the sleep mode longer than other suspended client machines coupled to the server over the network.

9. The machine readable storage medium of claim 8, wherein a suspended client machine that receives the wakeup transition signal will remain in the active mode for at least a predetermined period of time after transitioning from the sleep mode to the active mode.

10. The machine readable storage medium of claim 7, wherein the sleep transition signal is sent to active client machines that have been in the active mode longer than other active client machines in the plurality of active client machines coupled to the server over a network.

11. The machine readable storage medium of claim 10, wherein a suspended client machine that receives sleep transition signal will remain in the sleep mode for at least a predetermined period of time after transitioning from the active mode to the sleep mode.

12. The machine readable storage medium of claim 7, wherein the rate at which the overall utilization parameter is increasing is determined when the overall utilization parameter is above a first threshold, the rate at which the overall utilization parameter is decreasing is determined when the overall utilization parameter is below a second threshold, and the first threshold is greater than the second threshold.

13. A server comprising:
a processing device; and
a storage medium storing instructions that, when executed by the processing device, causes the server to
receive, at predefined time intervals, client utilization data, the client utilization data including client processing unit utilization or client memory utilization data for each of a plurality of active client machines coupled to the server over a network;

determine an overall utilization parameter for the plurality of active client machines based upon the received client utilization data at a time interval;

determine a rate at which the overall utilization parameter is changing in response to the overall utilization parameter being above or below a threshold;

determine how many client machines to transition between an active mode and a sleep mode based upon the rate and in response to the overall utilization parameter being above or below the threshold; and send a transition signal to the determined number of client machines to transition between an active mode and a sleep mode, wherein, when the overall utilization parameter is above the threshold, the transition signal is a wakeup transition signal and the determined number of client machines is a number of suspended client machines to transition to the active mode based upon the rate at which the overall utilization parameter is increasing, and wherein, when the overall utilization parameter is below the threshold, the transition signal is a sleep transition signal and the determined number of client machines is a number of the active client machines to transition to the sleep mode based upon the rate at which the overall utilization parameter is decreasing.

14. The server of claim 13, wherein the wakeup transition signal is sent to suspended client machines that have been in the sleep mode longer than other suspended client machines coupled to the server over the network.

15. The server of claim 14, wherein a suspended client machine that receives the wakeup transition signal will remain in the active mode for at least a predetermined period of time after transitioning from the sleep mode to the active mode.

16. The server of claim 13, wherein the sleep transition signal is sent to active client machines that have been in the active mode longer than other active client machines in the plurality of active client machines coupled to the server over a network.

17. The server of claim 16, wherein a suspended client machine that receives sleep transition signal will remain in the sleep mode for at least a predetermined period of time after transitioning from the active mode to the sleep mode.

18. The server of claim 13, wherein the rate at which the overall utilization parameter is increasing is determined when the overall utilization parameter is above a first threshold, the rate at which the overall utilization parameter is decreasing is determined when the overall utilization parameter is below a second threshold, and the first threshold is greater than the second threshold.

* * * * *